(12) United States Patent
Takahashi et al.

(10) Patent No.: US 6,499,450 B2
(45) Date of Patent: Dec. 31, 2002

(54) VALVE TIMING CONTROL SYSTEM FOR INTERNAL COMBUSTION ENGINE

(75) Inventors: Tatsuhiko Takahashi, Hyogo-ken (JP); Atsuko Hashimoto, Tokyo (JP); Hirofumi Ohuchi, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/892,863

(22) Filed: Jun. 28, 2001

(65) Prior Publication Data

US 2002/0062816 A1 May 30, 2002

(30) Foreign Application Priority Data

Nov. 28, 2000 (JP) .................................... 2000-361439

(51) Int. Cl.$^7$ .................................................. F01L 1/34
(52) U.S. Cl. ................................ 123/90.15; 123/90.17
(58) Field of Search .......................... 123/90.12, 90.15, 123/90.16, 90.17, 90.27, 90.31, 90.34, 90.6, 406.12, 478

(56) References Cited

U.S. PATENT DOCUMENTS

| | | | | |
|---|---|---|---|---|
| 5,738,056 A | * | 4/1998 | Mikame et al. | 123/90.17 |
| 5,797,361 A | * | 8/1998 | Mikame et al. | 123/90.17 |
| 5,924,395 A | * | 7/1999 | Moriya et al. | 123/179.18 |
| 6,024,062 A | * | 2/2000 | Kako et al. | 123/90.17 |
| 6,173,687 B1 | * | 1/2001 | Fukuhara et al. | 123/90.17 |
| 6,332,439 B2 | * | 12/2001 | Sekiya et al. | 123/90.17 |
| 6,386,164 B1 | * | 5/2002 | Mikame et al. | 123/90.17 |
| 6,397,803 B1 | * | 6/2002 | Fujiwara et al. | 123/90.15 |

FOREIGN PATENT DOCUMENTS

| | | |
|---|---|---|
| DE | 101 27 168 A1 | 2/2002 |
| JP | 9-324613 | 12/1997 |
| JP | 11-210424 | 8/1999 |

* cited by examiner

*Primary Examiner*—Tony M. Argenbright
*Assistant Examiner*—Hai H. Huynh
(74) *Attorney, Agent, or Firm*—Sughrue Mion, PLLC

(57) ABSTRACT

A valve timing control system for accelerating activation of a catalytic converter in an internal combustion engine in a cold starting operation mode. The system includes actuators (15, 16) coupled to cam shafts (15C, 16C), hydraulic pressure supply units (19, 20) for driving the actuators (15; 16), and a controller (21A) for controlling a hydraulic pressure for the actuators (15, 16) in dependence on engine operation states to change phase of the cam shafts (15C; 16C) relative to a crank shaft. The actuator (15; 16) includes a locking mechanism (155, 157) for setting the relative phase to a lock-up position, and an unlocking mechanism (156) for releasing the locking mechanism in En response to a predetermined hydraulic pressure. The controller (21A) sets the relative phase to the lock-up position in a starting operation, while controlling the relative phase to be advanced in an engine state succeeding to the starting operation.

7 Claims, 10 Drawing Sheets

VALVE TIMING CONTROL SYSTEM FOR INTERNAL COMBUSTION ENGINE

BACKGROUND OF THE INVENTION

1. Field of the Invention

The present invention relates in general terms to a valve timing control system for an internal combustion engine for controlling operation timings of intake valves and exhaust valves of the engine in dependence on engine operating states. More particularly, the present invention is concerned with a valve timing control system for an internal combustion engine which system is designed for promoting temperature-rise (or temperature-up) of a catalytic converter disposed in an exhaust pipe of the engine for is realizing a significant reduction of harmful exhaust gas components discharged from the engine by controlling the valve timing toward an advanced phase or state during idling operation of the engine in a cold engine state (i.e., engine state of a low temperature).

2. Description of Related Art

In recent years, the statutory regulations imposed in connection with emission of harmful materials or substances contained in the exhaust gas discharged to the atmosphere from the internal combustion engine mounted on a motor vehicle or automobile become more and more severe from the standpoint of environmental protection. Under the circumstances, there exists a great demand for reducing the emission of harmful materials or substances contained in the exhaust gas of the internal combustion engine.

In general, there have heretofore been known two sorts of methods of reducing the harmful exhaust gas components. One method is directed to reduction of the harmful gas directly discharged from the internal combustion engine (hereinafter also referred to simply as the engine) while the other method is directed to the reduction of the harmful components through posttreatment of the engine exhaust gas with the aid of a catalytic converter (hereinafter also referred to simply as the catalyst) installed within the exhaust pipe of the engine at an intermediate portion.

As is well known in the art, in the catalyst such as mentioned above, reaction of rendering the harmful gas components to be harmless is difficult or unable to take place unless the temperature of the catalyst has reached a predetermined value. Consequently, it is an important requirement to increase or rise speedily the temperature of the catalyst even when the internal combustion engine is, for example, in the course of starting operation in the cold state (i.e., in the state of low temperature).

In this conjunction, it is also known that in most of the internal combustion engines known heretofore, cam shafts which plays an essential role in determining the timings for opening and closing the intake and exhaust valves are so arranged as to be rotationally driven by a crank shaft through the medium of timing belts (or timing chains).

Accordingly, the timings for opening and closing the intake and exhaust valves (which timing may also be referred to as the cam angles) are so controlled as to remain constant relative to the crank angle notwithstanding of the fact that the valve timings as required may change in dependence on the operating states of the engine.

However, in recent years, a valve timing control Ad system designed to be capable of changing or modifying the valve timings has been adopted for practical applications with a view to enhancing the fuel-cost performance of the engine while ensuring improvement of the exhaust gas quality.

The valve timing control system of this type is disclosed in, for example, in Japanese Patent Application Laid-Open Publication No. 324613/1997 (JP-A-9-324613).

The valve timing control system disclosed in the above-mentioned publication includes a variable valve timing mechanism (also referred to as the VVT mechanism in short) which is comprised of vanes each disposed rotatably within a housing for changing the phase (or angular position) of the cam shafts which is adapted to drive the intake valves and the exhaust valves. Incidentally, concerning arrangement of the vanes, description will be made later on.

At this juncture, however, it should be mentioned that in the engine starting operation, the vane of the variable valve timing mechanism is held substantially at a mid position (start corresponding position) for controlling or regulating the relative angular displacement of the cam angle relative to the crank angle and releasing the regulation or control after lapse of a predetermined time.

For having better understanding of the concept underlying the present invention, description will first be made in some detail of a hitherto known or conventional valve timing control system of an internal combustion engine. FIG. 6 is a functional block diagram showing generally and schematically a configuration of a conventional valve timing control system of an internal combustion engine together with several peripheral parts of the engine.

Referring to FIG. 6, provided in association with an intake pipe 4 for feeding the air into a combustion chamber(s) defined within the cylinder(s) of the engine 1 are an air cleaner 2 for purifying the intake air, an air flow sensor 3 for measuring the quantity or flow rate of the intake air. Further, installed in the intake pipe 4 are a throttle valve 5 for adjusting or regulating the intake air quantity (i.e., the amount or flow rate of the intake air) to thereby control the output of the engine 1, an idle speed control valve (also referred to simply as the ISCV in short) 6 for adjusting or regulating the intake air flow which bypasses the throttle valve 5 to thereby effectuate the engine rotation speed (rpm) control in the idling operation mode, and a fuel injector 7 for charging or injecting an amount of fuel which conforms with the intake air quantity.

Additionally, provided internally of the combustion chamber of the engine cylinder 1 is a spark plug 8 for producing a spark discharge for triggering combustion of the air-fuel mixture charged in the combustion chamber defined within the cylinder. To this end, the spark plug 8 is electrically connected to an ignition coil 9 which supplies electric energy of high voltage to the spark plug 8.

An exhaust pipe 10 is provided for discharging an exhaust gas resulting from the combustion of the air-fuel mixture within the engine cylinder. An $O_2$-sensor 11 and a catalytic converter 12 are disposed in the exhaust pipe 10. The $O_2$-sensor 11 serves for detecting the content of residual oxygen contained in the exhaust gas.

The catalytic converter or catalyst 12 is constituted by a three-way catalytic converter known by itself is capable of eliminating simultaneously harmful gas components such as HC (hydrocarbon), CO (carbon monoxide) and $NO_x$ (nitrogen oxides) contained in the exhaust gas.

A sensor plate 13 designed for detecting the crank angle is mounted on a crank shaft (not shown) so as to corotate therewith. The sensor plate 13 is provided with a projection (not shown) at a predetermined crank angle in the outer periphery thereof.

A crank angle sensor 14 is installed at a position diametrically opposite to the outer periphery of the sensor plate 13 for the purpose of detecting the angular position of the crank shaft in cooperation with the sensor plate 13. Thus, the crank angle sensor 14 can generate an electric signal indicative of the crank angle, i.e., the crank angle signal, every time the projection of the sensor plate 13 passes by the crank angle sensor 14. In this way, the rotating position or angular position (crank angle) of the crank shaft can be detected.

The engine 1 is equipped with valves for putting into communication the intake pipe 4 and the exhaust pipe 10 to each other, wherein the timings for driving the intake and exhaust valves are determined by the cam shafts which are rotated at a speed equal to a half of that of the crank shaft, as will be described later on.

Actuators 15 and 16 for changing adjustably the cam phases are designed to change the timings for driving or actuating the intake and exhaust valves, respectively.

More specifically, each of the actuators 15 and 16 is comprised of a retarding hydraulic chamber and an advancing hydraulic chamber partitioned from each other (described later on) for changing or varying the rotational or angular positions (phases) of the cam shafts 15C and 16C, respectively, relative to the crank shaft.

Cam angle sensors 17 and 18 are disposed at positions diametrically opposite to the outer periphery of cam angle detecting sensor plates (not shown) for the purpose of detecting the angular positions of the cams(i.e., cam angles or phases) through cooperation with the sensor plate. More specifically, each of the cam angle sensors 17 and 18 is designed to generate a pulse signal indicative of the cam angle (i.e., the cam angle signal) in response to a projection formed in the outer periphery of the associated cam angle detecting sensor plate in a similar manner as the crank angle sensor 14 described previously. In this way, it is possible to detect the cam angles (or angular position of the cam shafts).

Oil control valves (also referred to as the OCV in short) 19 and 20 constitute hydraulic pressure supply units in cooperation with oil pumps (not shown) and serve for controlling or regulating the hydraulic pressure supplied to the individual actuators 15 and 16 for thereby controlling the cam phases. Parenthetically, the oil pump is designed to feed oil at a predetermined hydraulic pressure.

An electronic control unit (also referred to simply as the ECU) 21 which may be constituted by a microcomputer or microprocessor serves as a control means for the internal combustion engine system. Among others, the ECU 21 is in charge of controlling the fuel injectors 7 and the spark plugs 8 as well as the cam phases (angular positions of the cams) of the actuators 15 and 16 in dependence on the engine operating states detected by the various sensors such as the air-flow sensor 3, the $O_2$-sensor 11, the crank angle sensor 14 and the cam angle sensors 17 and 18.

Further, provided in association with the throttle valve 5 is a throttle position sensor (not shown in the figure) for detecting the throttle opening degree while a water temperature sensor is provided for the engine 1 for detecting the temperature of cooling water therefor. The throttle opening degree and the cooling water temperature as detected are also inputted to the ECU 21 as the information indicative of the operating state of the engine 1 similarly to the various sensor information mentioned above.

Next, description will be made of the conventional engine control operation performed by the prior art valve timing control system shown in FIG. 6. Firstly, the air flow sensor 3 measures the air quantity (flow rate of the intake air) fed to the engine 1, the output of the air-flow sensor 3 being supplied to the ECU 21 as the detection information indicative of the operating state of the engine.

The electronic control unit or ECU 21 arithmetically determines the fuel quantity or amount which conforms to the air quantity as measured to thereby drive or actuate correspondingly the fuel injector 7. At the same time, the ECU 21 controls the time duration for electrical energization of the ignition coil 18 as well as the timing for interruption thereof to thereby produce a spark discharge at the spark plug 8 for igniting or firing the air-fuel mixture charged within the combustion chamber defined within the engine cylinder at a proper timing.

On the other hand, the throttle valve 5 serves for adjusting or regulating the amount of intake air fed to the engine to thereby control correspondingly the output torque or power generated by the engine 1. The exhaust gas resulting from the combustion of the air-fuel mixture within the cylinder of the engine 1 is discharged through the exhaust pipe 10.

In that case, the catalytic converter 12 disposed within the exhaust pipe 10 at an intermediate location thereof converts the harmful components contained in the exhaust gas such as hydrocarbon (HC) (unburned gas), carbon monoxide (CO) and nitrogen oxides ($NO_x$) into harmless carbon dioxide and water ($H_2O$). In this way, the engine exhaust gas is purified.

In order to make available the maximum purification efficiency of the three-way catalytic converter 12, the $O_2$-sensor 11 is installed in association with the exhaust pipe 10 for detecting the amount of residual oxygen contained in the exhaust gas. The output signal of the $O_2$-sensor 11 is inputted to the electronic control unit or ECU 21 which responds thereto by regulating in a feedback loop the amount of fuel injected through the fuel injector 7 so that the air-fuel mixture which is to undergo the combustion can assume the stoichiometric ratio.

In addition, the ECU 21 controls the actuators 15 and 16 (which constitute parts of the variable valve timing mechanism) in dependence on the engine operating state for regulating the timings at which the intake and exhaust valves are to be driven or actuated.

In the following, referring to FIGS. 7 to 14, description will be made in concrete of the phase angle control operation performed for the cam shafts 15C and 16C by the conventional valve timing control system for the internal combustion engine.

By the way, in the case of the conventional internal combustion engine of the fixed valve timing scheme (not shown), torque of the crank shaft is transmitted to the cam shafts through the medium of the timing belts (timing chains) and transmission mechanisms including pulleys and sprockets and coupled operatively to the cam shafts for corotation with the pulleys.

By contrast, in the case of the internal combustion engine equipped with the variable valve timing mechanism, there are provided the actuators which are designed to change the relative phase position between the crank shaft and the cam shafts in place of the pulleys and the sprockets mentioned above.

FIG. 7 is a view for illustrating relation between the crank angle [° CA] and the valve lift stroke (indicating the degree of valve opening [mm]), (hereinafter also referred to as the valve opening quantity). In the figure, the top dead center in the compression stroke of the cylinder is designated by reference symbol TDC.

In FIG. 7, a single-dotted broken line curve represents change of the valve lift stroke delimited mechanically in the most retarded state, a broken line curve represents change of the valve lift stroke delimited mechanically in the most advanced state, and a solid line curve represents change of the valve lift stroke in a locked state set by a locking mechanism (described hereinafter).

Referring to FIG. 7, it is to be noted that the peak position of the valve lift stroke on the retarded side (right-hand side as viewed in the figure) with reference to the top dead center (TDC) corresponds to the fully opened position of the intake valve while the peak position of the valve lift stroke on the advanced side (left-hand side as viewed in the figure) corresponds to the fully opened position of the exhaust valve.

Accordingly, difference in the crank angle between the peaks on the retarded side and the advanced side (i.e., difference between the single-dotted line curve and the broken line curve) represents the range within which the valve timing can be changed (i.e., valve timing adjustable range). To say in another way, the valve timing can be changed or adjusted within the crank angle range defined between the broken line curve and the single-dotted line curve in either of the suction and exhaust operation.

FIG. 8 is a timing chart for illustrating phase or timing relations between the output pulse signal of the crank angle sensor 14 on one hand and that of the cam angle sensor 17 or 18 on the other hand. More specifically, shown in FIG. 8 are the output pulse signals of the cam angle sensor 17 or 18 in both the most retarded state and the most advanced state, respectively, relative to the output of the crank angle sensor.

In this conjunction, it should be added that the phase position of the output signal of the cam angle sensor 17 or 18 relative to the output signal of the crank angle sensor 14 (i.e., crank angle signal) becomes different in dependence on the positions at which the cam angle sensors 17 and 18 are mounted.

At this juncture, it should further be mentioned that retarding of the valve timing means that the valve opening start timings of both the intake and exhaust valves is retarded or delayed relative to (or with reference to) the crank angle, while advancing of the valve timing means that the valve opening start timings of both the valves is advanced relative to the crank angle.

The opening start timings for the intake valve and the exhaust valves can be changed or modified by means of the actuators 15 and 16 which constitute parts of the variable valve timing mechanism to be thereby so controlled as to assume a given retarded position or advanced position within the aforementioned valve timing adjustable or variable range mentioned hereinbefore by reference to FIG. 7.

FIGS. 9 to 11 are views showing internal structures of the actuators 15 and 16 which are implemented in a substantially identical structure. More specifically, FIG. 9 shows the same in a state where the cam phase is adjusted to the most retarded position (corresponding to the state indicated by the single-dotted line curve in FIG. 7), FIG. 10 shows the same in a state where the cam phase is adjusted to the locked or lock-up position (corresponding to the state indicated by the solid line curve in FIG. 7), and FIG. 11 shows the same in a state where the cam phase is adjusted to the most advanced position (corresponding to the state indicated by the broken line curve in FIG. 7), respectively.

Referring to FIGS. 9, 10 and 11, each of the actuators 15 and 16 is comprised of a housing 151 which is rotatable in the direction indicated by an arrow, a vane 152 rotatable together with the housing 151, retarding hydraulic chambers 153 and advancing hydraulic chambers 154 both defined internally of the housing 151, a lock pin 155 and a spring 156 which are also provided within the housing 151, and locking recesses 157 formed in the vane 152.

Power or torque is transmitted to the housing 151 from the crank shaft through the medium of a belt/pulley assembly (not shown) with the speed of rotation being reduced by a factor of ½.

The position (phase position) of the vane 152 is caused to shift within the housing 151 in response to the hydraulic pressure supplied selectively to the retarding hydraulic chamber 153 or the advancing hydraulic chamber 154.

The range of operation (hereinafter also referred to as the operation range) of the vane 152 is determined or defined by the retarding hydraulic chamber 153 and the advancing hydraulic chamber 154.

The spring 156 resiliently urges the lock pin 155 in the protruding direction while the locking recess 157 is formed at a predetermined vane lock-up position so that the recess 157 faces in opposition to the tip end of the lock pin 155.

Parenthetically, an oil feed port (not shown) is formed in the locking recess 157 through which the hydraulic medium (i.e., oil in this case) is supplied interchangeably from either one of the retarding hydraulic chamber 153 and the advancing hydraulic chamber 154 within which a higher hydraulic pressure prevails.

The vanes 152 designed to operate within the retarding hydraulic chamber 153 and the advancing hydraulic chamber 154 (i.e., operation range of the vane) and shifted in the angular position or phase are operatively coupled to the cam shafts 15C and 16C for driving the intake and exhaust valves of the engine cylinders.

Although not shown in the drawings, the actuator 16 on the exhaust side is provided with a spring for resiliently urging the vane 152 so that it can assume the advanced position against the reaction force of the cam shaft 16C.

The actuators 15 and 16 are driven under the hydraulic pressure of a lubricant oil of the engine 1 supplied through the oil control valves 19 and 20. For controlling the cam angle phases of the actuators 15 and 16 in such manner as illustrated in FIGS. 9 to 11, the amount of oil (i.e., hydraulic pressure) fed to the actuators 15 and 16 is controlled.

By way of example, regulation of the cam angle phase to the most retarded position, as illustrated in FIG. 9, can be realized by feeding oil into the retarding hydraulic chamber 153. On the contrary, regulation of the cam angle phase to the most advanced position, as illustrated in FIG. 11, can be effectuated by feeding oil into the advancing hydraulic chamber 153.

The oil control valves 19 and 20 are in charge of selecting either the retarding hydraulic chamber 153 or the advancing hydraulic chamber 154 for the oil supply. FIGS. 12, 13 and 14 show in side-elevational sectional views the internal structures of the oil control valves 19 and 20 which are implemented substantially identically.

Referring to FIGS. 12 to 14, each of the oil control valves 19 and 20 is comprised of a cylindrical housing 191, a spool 192 slideably disposed within the housing 191, a solenoid coil 193 for driving continuously the spool 192 and a spring 194 for resiliently urging the spool 192 in the restoring direction.

The housing 191 is provided with an orifice 195 which is hydraulically communicated to a pump (not shown), orifices 196 and 197 hydraulically connected to the actuator 15 or 16, and drain orifices 198 and 199 fluidly communicated to an oil pan.

The orifice 196 can be communicated to the retarding hydraulic chamber 153 of the actuator 15 or the advancing hydraulic chamber 154 of the actuator 16. On the other hand, the orifice 197 can be communicated to the advancing hydraulic chamber 154 of the actuator 15 or the retarding hydraulic chamber 153 of the actuator 16.

The orifices 196 and 197 are selectively put into communication with the oil feeding orifice 195 in dependence on the axial position of the spool 192 (i.e., the position of the spool in the longitudinal direction thereof). In the state shown in FIG. 12, the orifice 195 is shown as having been placed in communication with the orifice 196, while in FIG. 14, the orifice 195 is shown as being communicated to the orifice 197.

Similarly, the drain orifices 198 and 199 are selectively put into communication with the orifice 197 or 196 in dependence on the axial position of the spool 192. In the state shown in FIG. 12, the orifice 197 is shown as being communicated with the orifice 198, while in FIG. 14, the orifice 196 is being communicated to the orifice 199.

The oil feed port formed in the locking recess 157 is so arranged as to be supplied with oil when the oil control valves 19 and 20 are in the electrically driven state (see FIG. 14). More specifically, when the hydraulic pressure applied to the locking recess 157 exceeds the spring force of the spring 156, the lock pin 155 is pushed out from the locking recess 157, whereby the locked state is cleared.

FIG. 12 shows the state in which the electric current flowing through the solenoid or coil 193 is at a minimum value and thus the spring 194 is stretched or relaxed to a maximum extent.

Assuming that the oil control valve shown in FIG. 12 serves as the oil control valve 19 of the intake side, the hydraulic medium or oil supplied from the pump via the orifice 195 flows into the retarding hydraulic chamber 153 of the actuator 15, as a result of which the actuators 15 is shifted to the state illustrated in FIG. 9.

Consequently, the oil resident in the advancing hydraulic chamber 154 of the actuator 15 is forced to flow out through the orifice 197 to be finally discharged to the oil pan by way of the orifice 198.

On the other hand, assuming that the oil control valve shown in FIG. 12 serves as the oil control valve 20 on the exhaust side, the situation is reversed. Namely, the hydraulic medium or oil supplied from the pump via the orifice 196 flows into the advancing hydraulic chamber 154 of the actuator 16, as a result of which the actuators 16 is ultimately set to the state illustrated in FIG. 11.

In that case, the oil contained in the retarding hydraulic chamber 153 of the actuator 16 is forcibly discharged to the oil pan by way of the orifices 197 and 198.

By virtue of the hydraulic circuit arrangement described above by reference to FIG. 12, valve overlap can be suppressed to a minimum even upon occurrence of failure such as shutdown of electric current supply to the oil control valves 19 and 20 disposed at the intake side and the exhaust side, respectively, due to wire breakage or the like. This feature is advantageous from the viewpoint of ensuring high withstandability against the engine stall.

In FIG. 14, the state is illustrated in which where the current flowing through the coil 193 is of a maximum value and thus the spring 194 is compressed to the minimum length.

Assuming, by way of example, that the oil control valve shown in FIG. 14 serves as the oil control valve 19 installed on the intake side, the oil fed from the pump is caused to flow into the advancing hydraulic chamber 154 of the actuator 15 via the orifice 197, whereas the oil in the retarding hydraulic chamber 153 of the actuator 15 is discharged via the orifices 196 and 199.

On the other hand, in the case where the oil control valve shown in FIG. 14 serves as the oil control valve 20 on the exhaust side, the oil fed from the pump is forced to flow into the retarding hydraulic chamber 153 of the actuator 16 via the orifice 197, while the oil in the advancing hydraulic chamber 154 of the actuator 16 is discharged via the orifices 196 and 199.

FIG. 13 shows the state corresponding to the 1valve timing control end position or lock-up position (mid position). In this state, the vanes 152 of the actuators 15 and 16 are at desired positions, respectively, (see the state illustrated in FIG. 10).

In the state illustrated in FIG. 13, the orifice 195 provided at the oil supply side is not directly communicated to the orifice 196 or 197 disposed on the actuator side. However, due to oil leakage, oil is supplied to the oil feed port of the locking recess 157 (see FIG. 10).

Accordingly, even when the vane 152 is at the lock-up position, there may arise such situation in which the hydraulic pressure applied to the oil feed port under the oil leakage overcomes the spring force of the spring 156 (i.e., exceeds the predetermined unlocking hydraulic pressure value). In that case, the lock pin 155 is caused to disengage from the locking recess 157, allowing the vane 152 to move or operate within the housing 151.

At this juncture, it should be mentioned that the predetermined unlocking hydraulic pressure mentioned above may be set at a necessary minimum value.

Furthermore, the positions (phases) of the vanes 152 of the actuators 15 and 16 which play the role for determining the valve timing can appropriately be controlled by detecting the vane positions by mans of the cam angle sensors 17 and 18.

The cam angle sensors 17 and 18 are mounted at the positions which enable these sensors to detect the relative position between the crank shaft on one hand and the cam shafts 15C and 16C on the other hand.

Referring to FIG. 8, the phase difference relative to the output signal of the crank angle sensor at the position where the valve timing is most advanced (see the broken line curve shown in FIG. 7) is indicated by A, whereas the phase difference relative to the output signal of the crank angle sensor at the position where the valve timing is most retarded (see the single-dotted line curve shown in FIG. 7) is indicated by B.

The ECU 21 is designed or programmed to perform the feedback control so that the phase difference A or B as detected coincides with the desired value, whereby the valve timing control is carried out at given positions.

More specifically, it is assumed, by way of example only, that on the intake side, the detected position of the cam angle sensor 17 relative to the detection timing of the crank angle sensor 14 is retarded with reference to the desired position arithmetically determined by the ECU 21. In that case, the detected position (detection timing) of the cam angle sensor 17 has to be to advanced the desired position. To this end, the amount of the electric current flowing through the coil 193 of the oil control valve 19 is regulated in dependence on the difference between the detected position and the desired position, to thereby control correspondingly the spool 192.

Further, in the case where the difference between the desired position and the detected position is large, the amount of electric current supplied to the coil 193 of oil control valve 19 is increased in order to allow the desired position to be attained speedily.

As a result of this, the aperture of the orifice 197 opened into the advancing hydraulic chamber 154 of the actuator 15 is increased, which results in increasing of the amount of oil fed to the advancing hydraulic chamber 154.

Subsequently, as the detected position approaches to the desired position, the current supply to the coil 193 of the oil control valve 19 is decreased so that the position of the spool 192 of the oil control valve 19 becomes closer to the state illustrated in FIG. 13.

At the time point when coincidence is found between the detected position and the desired position, the electric current supply to the coil 193 is so controlled that the oil flow path leading to the retarding hydraulic chamber 153 and the advancing hydraulic chamber 154 of the actuator 15 is intercepted, as can be seen in FIG. 13.

Incidentally, the desired position in the ordinary engine operation mode (e.g. running state succeeding to the warm-up operation) can be so set or established that optimal valve timing can be realized in accordance with the engine operation state by previously storing, for example, two-dimensional map data values obtained experimentarily in correspondence to the operating states (e.g. engine rotation speeds (rpm) and engine loads), respectively, in a read-only memory or ROM incorporated in the ECU 21.

On the other hand, in the engine starting operation mode, the rotation speed of the oil pump which is driven by the engine 1 is not sufficiently high. Consequently, the volume of the oil fed to the actuator 15 is also insufficient. Thus, the control of the valve timing to the advanced position by controlling the hydraulic pressure as described previously is rendered practically impossible.

Such being the circumstances, jolting or fluttering of the vane 152 due to shortage of the hydraulic pressure has to be prevented by engaging the lock pin 155 with the locking recess 157, as illustrated in FIG. 10.

In that case, if, the intake valve is actuated excessively retardingly (i.e., if the valve timing is overretarded), the actual compression ratio becomes lowered while excessive advancing of actuation of the intake valve (i.e., overadvancing of the valve timing) will result in increasing of the time period during which the intake valve and the exhaust valve overlap with each other. In other words, overretarded or overadvanced actuation of the intake valve results in increasing of the pumping loss.

Certainly, the overretarding or overadvancing actuation control of the intake valve can profitably be adopted for increasing the rotation speed in the engine starting operation (e.g. upon cranking) and triggering the initial explosion. However, because the combustion is essentially inadequate, complete combustion or explosion is difficult to realize.

On the other hand, overretarding of actuation of the exhaust valve will result in increasing of the overlap period during which the intake valve and the exhaust valve overlap with each other, similarly to the case where operation of the intake valve is advanced excessively. By contrast, overadvancing of the exhaust valve actuation will incur lowering of the actual expansion ratio, rendering it impossible to transmit the combustion energy sufficiently to the crank shaft.

As is apparent from the above, overretarding or overadvancing control of the valve timing in the engine starting operation or immediately thereafter may unwantedly incur degradation of the engine starting performance or the state incapable of starting the engine operation in the worst case.

Thus, for coping with the problems such as mentioned above in the engine starting operation, the vane 152 is fixedly set at the lock-up position (i.e., nearly mid position between the most retarded position and the most advanced position) by engaging the lock pin 155 into the locking recess 157, as shown in FIG. 10.

In that case, since the hydraulic pressure of the lubricating oil increases as the engine rotation speed (rpm) increases in succession to starting operation of the engine, the hydraulic pressure is fed to the actuators 15 and 16 because of the oil leakage described previously even in the state where the spool 192 is at the position shown in FIG. 13.

Such being the circumstances, when the hydraulic pressure applied to the locking recess 157 overcomes the spring force of the spring 156, the lock pin 155 is caused to disengage from the locking recess 157, allowing the vane 152 to move.

Thus, by controlling the oil control valves 19 and 20 after unlocking of the vanes, the hydraulic pressure fed to the retarding hydraulic chamber 153 and the advancing hydraulic chamber 154 can be regulated, whereby the valve timing retarding or advancing control can be carried out.

In that case, particularly in the high-speed rotation range of the engine 1, the valve timing is so controlled as to be retarded more when compared with the engine starting operation for the purpose of realizing the suction inertia effect as well as enhancement of the volumetric efficiency and hence the output performance of the engine.

As can be appreciated from the foregoing, in the engine starting operation, the lock pins 155 of the actuators 15 and 16 are locked at a nearly mid position between the most retarded position and the most advanced position with a view to enhancing the engine starting performance. On the other hand, once the engine operation has been started after releasing of the locking mechanism, the valve timing is so controlled as to be retarded especially in the high-speed rotation range of the engine.

However, in the conventional valve timing control system for the internal combustion engine, no consideration has been given to such technical matters as improvement of the exhaust gas quality and promotion of temperature-rise of the catalyst.

SUMMARY OF THE INVENTION

In the conventional valve timing control system for the internal combustion engine, no consideration is given to the improvement of the exhaust gas quality and the acceleration or promotion of temperature-rise of the catalyst, as described above. To say in another way, the conventional valve timing control system suffers problems that the catalyst temperature can not sufficiently be increased and that the quality of the exhaust gas yet remains to be improved.

In the light of the state of the art described above, it is an object of the present invention to provide a valve timing control system for an internal combustion engine in which the actuator is locked at an intermediate position between the most retarded position and the most advanced position in the engine starting operation state or mode while being unlocked after the engine operation has been started and in which the valve timing is controlled to be advanced particularly in the idling operation in the cold engine state (i.e., in the cold-state idling operation mode) to thereby realize effectively acceleration or promotion of the temperature-rise of the catalyst and reduction of harmful exhaust gas components.

In view of the above and other objects which will become apparent as the description proceeds, there is provided according to an aspect of the present invention a valve timing control system for an internal combustion engine, which system includes a sensor means for detecting operating states of an internal combustion engine, intake and exhaust cam shafts for driving intake and exhaust valves, respectively, of the internal combustion engine in synchronism with a rotation of a crank shaft of the internal combustion engine, at least one actuator operatively connected to at least one of the cam shafts for driving the intake and exhaust valves, respectively, a hydraulic pressure supply unit for feeding a hydraulic pressure to drive the actuator, and a control means for controlling the hydraulic pressure fed from the hydraulic pressure supply unit to the actuator in dependence on the operating states of the internal combustion engine while changing relative phase of the cam shaft relative to the crank shaft. The actuator is comprised of a retarding hydraulic chamber and an advancing hydraulic chamber for setting an adjustable range of the relative phase, a locking mechanism for setting the relative phase to a lock-up position within the adjustable range, and a supply unit. The control means is designed for driving the locking mechanism for thereby controlling the relative phase to be set to the lock-up position when the internal combustion engine is detected as being in a starting operation state, while when the internal combustion engine is in a state which succeeds to the starting operation state, the locking mechanism is released by means of the unlocking mechanism with the hydraulic pressure fed from the hydraulic pressure supply unit to the retarding hydraulic chamber and the advancing hydraulic chamber being controlled for thereby executing a retarding control and an advancing control, respectively, for the relative phase. Thus, the relative phase is so controlled as to be advanced when the engine is operating in a cold-state idling operation mode.

By virtue of the arrangement described above, there is provided a valve timing control system for an internal combustion engine in which temperature rise behavior of the catalyst and reduction of harmful emission fumes can significantly be enhanced.

In a preferred mode for carrying out the invention, the lock-up position may be established as a phase position suited for the control performed in the starting operation mode of the internal combustion engine and in an operation state which immediately succeeds to the starting operation mode.

Owing to the feature described above, there can be realized the valve timing control system for the internal combustion engine whose starting performance can remarkably be improved.

In another preferred mode for carrying out the invention, the hydraulic pressure supply unit may be so designed as to validate the predetermined hydraulic pressure at least when it is detected that the internal combustion engine is operating in the cold-state idling operation mode (i.e., in the idling operation mode in the cold state).

With the arrangement of the valve timing control system described above, the valve timing advancing control can be performed by the actuator in the cold-state idling operation mode of the engine since the locking mechanism is released in that mode. Thus, the temperature rise of the catalyst and reduction of the harmful exhaust gas components can advantageously be accelerated or promoted.

In yet another preferred mode for carrying out the invention, the control means may be so designed as to control the relative phase to be set to the lock-up position when it is detected that the internal combustion engine is operating in an warm-up idling operation mode.

With the arrangement of the valve timing control system described above, the engine operation performance can significantly be improved in the idling operation of the engine in the warm-up state (i.e., in the warm-up idling operation mode) which approximates to the engine starting operation state.

In still another preferred mode for carrying out the invention, the control means may be so designed as to control an ignition timing of the internal combustion engine to be retarded when it is detected that the internal combustion engine is operating in the cold-state idling operation mode.

Owing to the arrangement of the valve timing control system described above, the temperature rise of the catalyst and hence the reduction of the harmful exhaust gas components can further be promoted to a great advantage.

In a further preferred mode for carrying out the invention, the control means may be so designed as to control quantity of a fuel supplied to the internal combustion engine to be decreased when it is detected that the internal combustion engine is operating in the cold-state idling operation mode.

With the arrangement of the valve timing control system described above, the temperature rise of the catalyst and hence the reduction of the harmful exhaust gas components can also be much promoted.

In another preferred mode for carrying out the invention, the control means may be so designed as to carry out the relative phase retarding or alternatively advancing control in dependence on the engine operating states at least when it is detected that the internal combustion engine is operating in other operation mode(s) than the warm-up idling operation mode after the engine has been warmed.

With the arrangement of the valve timing control system described above, performance of the internal combustion engine in the ordinary operation modes can considerably be improved to another advantage.

The above and other objects, features and attendant advantages of the present invention will more easily be understood by reading the following description of the preferred embodiments thereof taken, only by way of example, in conjunction with the accompanying drawings.

BRIEF DESCRIPTION OF THE DRAWINGS

In the course of the description which follows, reference is made to the drawings, in which.

DESCRIPTION OF THE PREFERRED EMBODIMENTS

Figure 1:
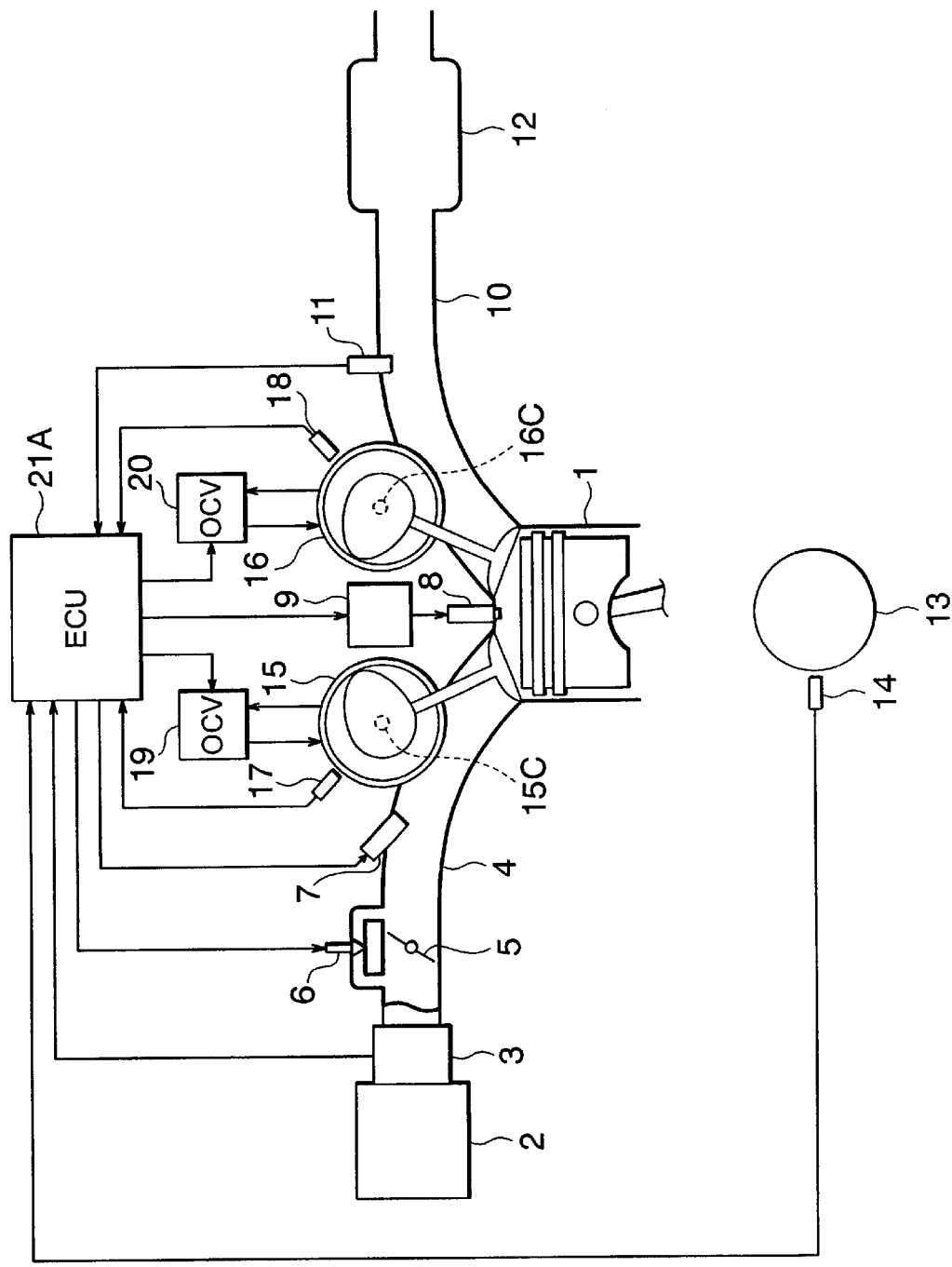
FIG. 1 is a schematic block diagram showing generally a configuration of a valve timing control system for an internal combustion engine according to a first embodiment of the present invention.

The present invention will be described in detail in conjunction with what is presently considered as preferred or typical embodiments thereof by reference to the drawings. In the following description, like reference characters designate like or corresponding parts throughout the several views.

Embodiment 1

In the following, a valve timing control system for an internal combustion engine according to a first embodiment of the present invention will be described in detail by reference to the drawings.

Figure 6:
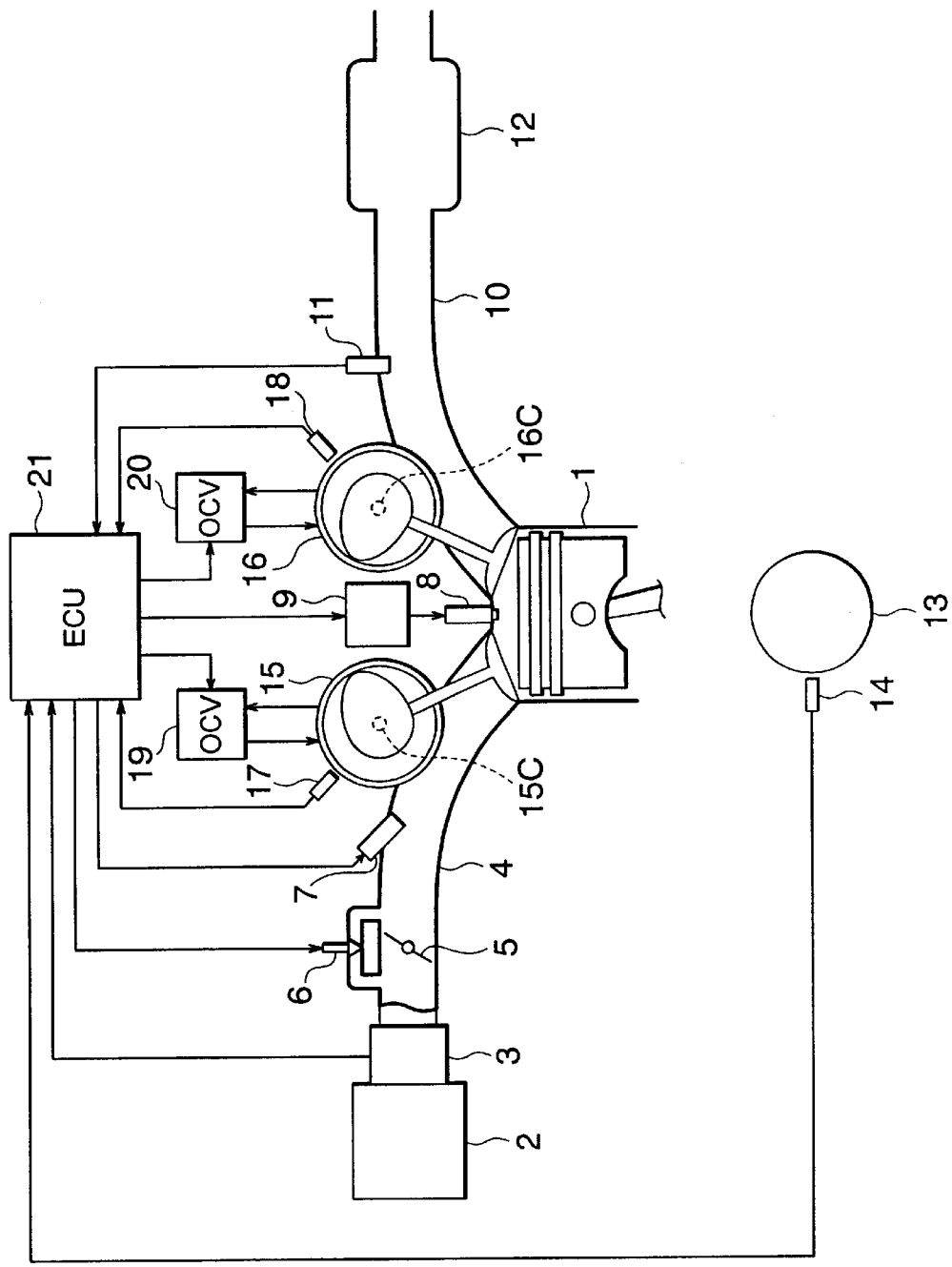
FIG. 6 is a functional block diagram showing generally and schematically a configuration of a conventional valve timing control system of an internal combustion engine known heretofore.

FIG. 1 is a schematic block diagram showing generally a configuration of the valve timing control system for the internal combustion engine according to the first embodiment of the invention. In the figure, components same as or equivalent to those mentioned hereinbefore by reference to FIG. 6 are denoted by like reference characters as those used in this figure and detailed description thereof is omitted.

Figure 7:
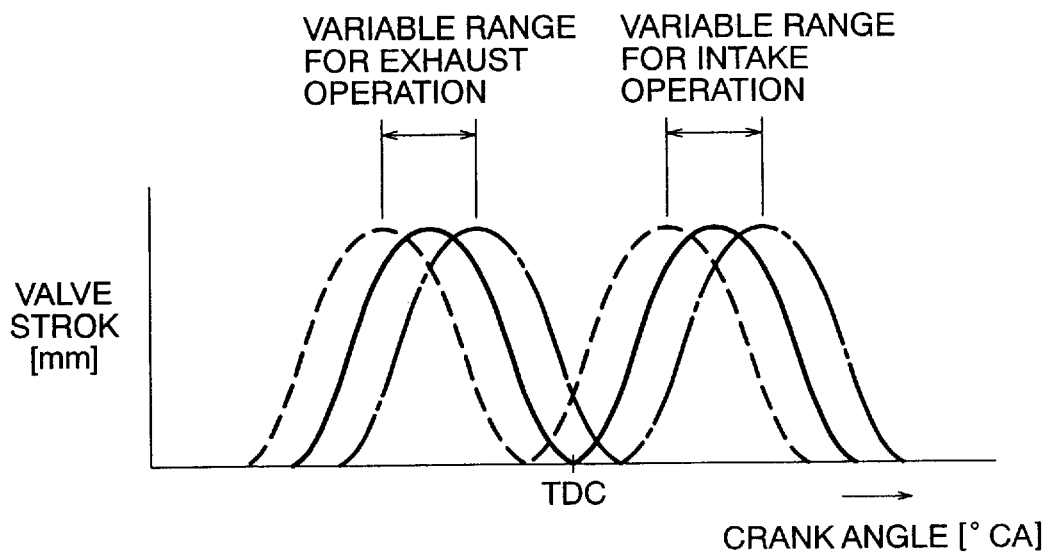
FIG. 7 is a view for illustrating a phase adjustable range of the conventional valve timing control system in terms of relation between crank angles and valve lift strokes.
Figure 8:
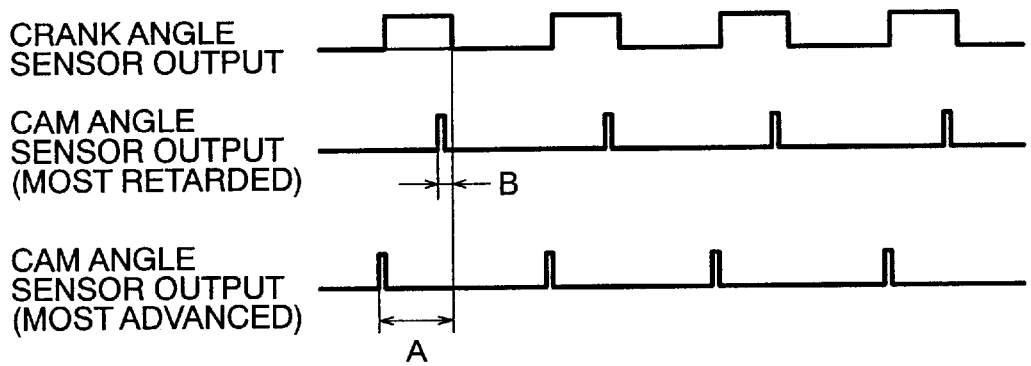
FIG. 8 is a timing chart for illustrating conventional phase or timing relations between individual output pulse signals of a crank angle sensor and cam angle sensors.

Accordingly, in the valve timing control system for the internal combustion engine according to the instant embodiment of the invention, the change control range of the valve timings for the intake valve and the exhaust valve is essentially same as shown in FIG. 7, and the relation between the output of the crank angle sensor and that of the cam angle sensor is also same as shown in FIG. 8.

Figure 9:
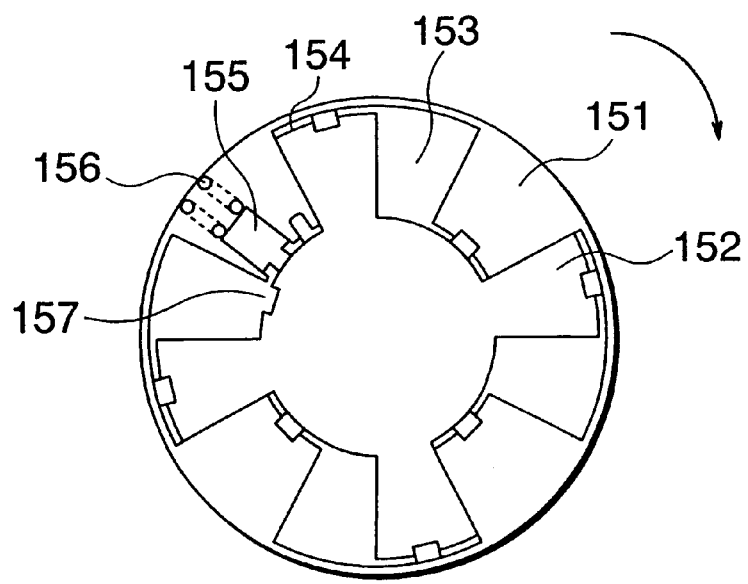
FIG. 9 is a perspective view showing an internal structure of a conventional actuator at a most retarded timing position.
Figure 10:
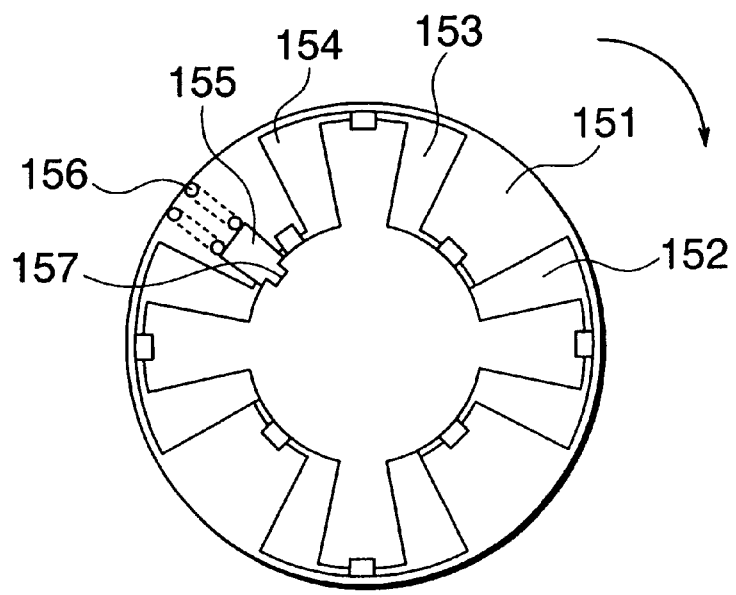
FIG. 10 is a perspective view showing an internal structure of the conventional actuator at a lock-up position.
Figure 11:
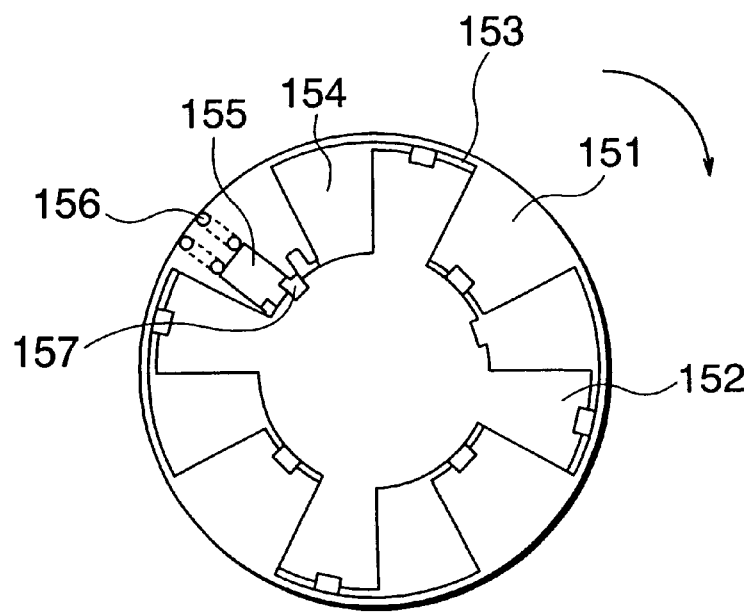
FIG. 11 is a perspective view showing an internal structure of the conventional actuator at a most advanced timing position.
Figure 12:
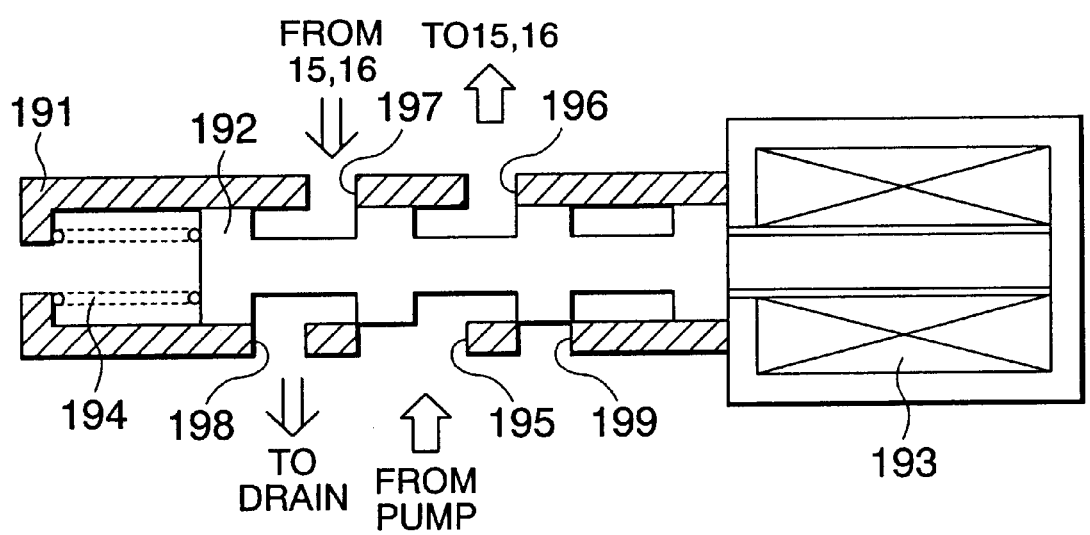
FIG. 12 is a side-elevational sectional view showing an internal structure of a conventional oil control valve unit (hydraulic pressure supply unit) in an electrically deenergized state.
Figure 13:
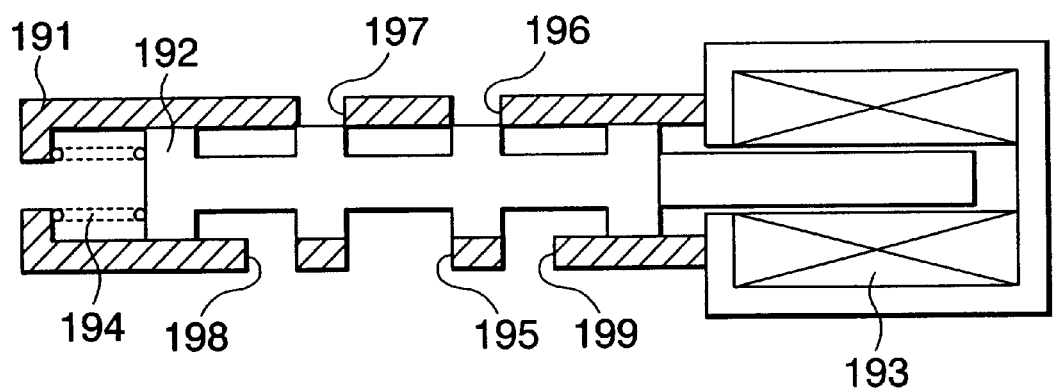
FIG. 13 is a side-elevational sectional view showing an internal structure of the conventional oil control valve unit in a lock-up state.
Figure 14:
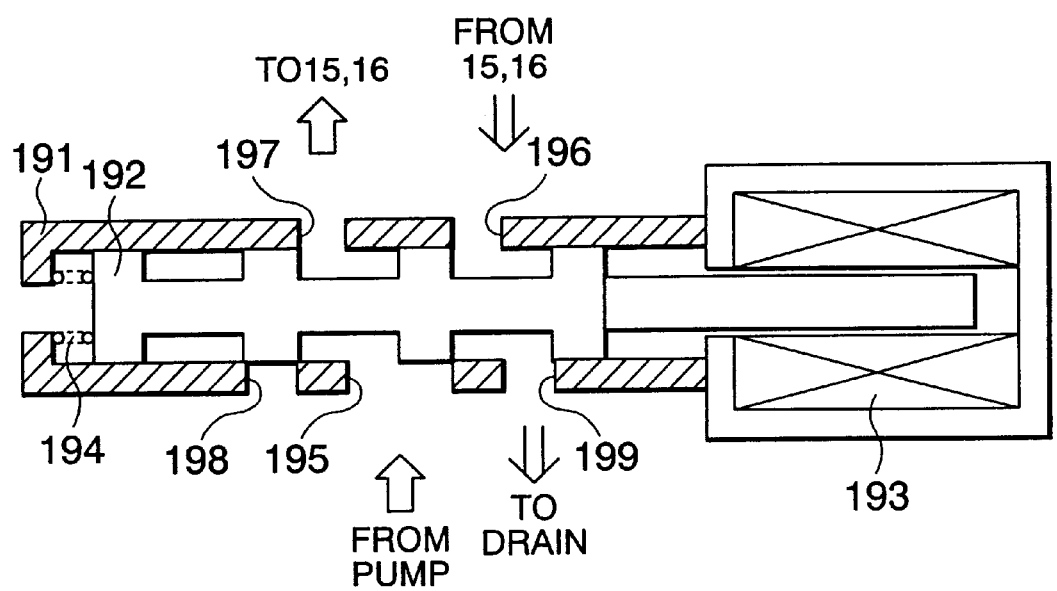
FIG. 14 is a side-elevational sectional view showing an internal structure of the conventional oil control valve unit in an electrically energized state.

Further, the structure of the actuators 15 and 16 are essentially identical with that shown in FIGS. 9, 10 and 11. Besides, the structures of the oil control valves (OCV) 19 and 20 are also essentially identical with those described hereinbefore in conjunction with FIGS. 12, 13 and 14.

Now, referring to FIG. 1, an electronic control unit (also referred to as the ECU in short) 21A shown in FIG. 1 includes a lock control means for setting the actuators 15 and 16 to the lock-up position or state by means of the locking mechanism and an unlock control means for performing retarding or advancing control of the actuators 15 and 16 after the actuators 15 and 16 are released from the lock-up state by means of an unlocking mechanism in succession to the engine starting operation, as described hereinbefore.

Further, in the valve timing control system now under consideration, the ECU 21A includes a cold-state idling operation control means for controlling the phase angles of the cam shafts 15C and 16C to advance relative to the crank shafts by means of the actuators 15 and 16 when it is detected that the engine 1 is operating in the idling mode in the cold engine state (i.e., the cold-state idling operation mode).

The aforementioned unlocking control means incorporated in the ECU 21A is so designed as to generate a predetermined hydraulic pressure from the oil pump to release the actuators from the locked state at least when it is decided that the engine 1 is operating in the cold-state idling operation mode.

Furthermore, the ECU 21A of the valve timing control system now concerned includes a warm-up idling operation control means for setting the actuators 15 and 16 to the lock-up position or state when it is detected that the engine 1 is operating in the idling mode in the warm-up state (i.e., the warm-up idling operation mode).

In this conjunction, it should be mentioned that the locked position of the actuators 15 and 16 is so set as to be a position desirable for the engine starting operation as well as for the engine state immediately succeeding thereto.

In other words, the position of the vane 152 locked by the lock pin 155 (see FIG. 10) is so set as to realize the valve timing suited for the engine starting operation.

As described hereinbefore, in the engine starting operation as well as in the state immediately succeeding thereto, both the overretarding and the overadvancing of the valve timing are accompanied with degradation of the engine starting performance. Thus, the relative position between the lock pin 155 and the locking recess 157 is previously so set that the valve timings suited for the engine starting operation as well as for the immediately succeeding engine operation without being necessarily limited to the mid position described hereinbefore by reference to FIG. 10.

In the cold-state idling operation succeeding to the engine start, the lock pins 155 of the actuators 15 and 16 have to be released from the locking recesses 157 for allowing the valve lift timing to be controlled to advance.

In this case, the lubricating oil pressure of the engine 1 is also made use of for actuation of the actuators 15 and 16 inclusive of the operation for releasing the lock pin 155). In this conjunction, it is to be noted that the lubricating oil pressure will change in dependence of the engine rotation speed (rpm), oil temperature and the like.

As described heretofore, at least in the case of performing the advancing control in the cold-state idling operation mode of the engine, it is required to make effective the hydraulic pressure in order to release the lock pin 155.

Additionally, after completion of the advancing control in the cold-state idling operation mode, the actuators 15 and 16 are so controlled as to be set to the locked position.

In that case, the feedback control may be carried out for sustaining substantially the lock-up position while holding the hydraulic pressure for clearing the lock-up state. Alternatively, the lock pin 155 may be engaged with the recess at the lock-up position.

When the acceleration pedal is depressed for starting to run the motor vehicle from this state, the rotation speed (rpm) of the engine increases, as a result of which the lock-up state is cleared while the engine control can be performed at the retarded or advanced position (not the lock-up position) in dependence on the operating state of the engine 1.

Next, referring to a flow chart shown in FIG. 2 together with FIGS. 7 to 14 mentioned hereinbefore, description will be made of the operation of the valve timing control system according to the first embodiment of the present invention.

Figure 2:
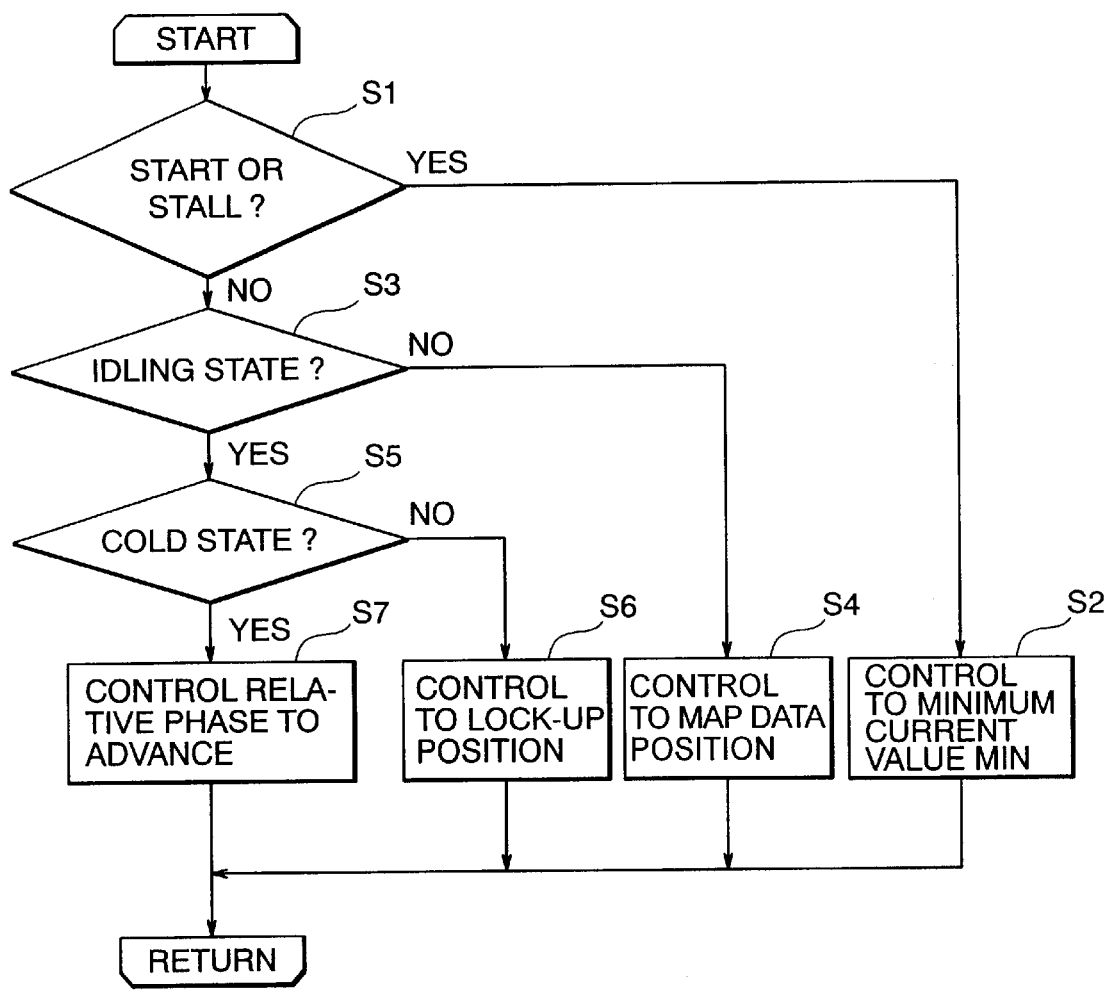
FIG. 2 is a flow chart for illustrating control operation of the valve timing control system according to the first embodiment of the present invention.

The processing routine illustrated in FIG. 2 is executed internally of the ECU 21A at a predetermined timing.

Referring to FIG. 2, it is firstly decided by the ECU 21A whether the engine 1 is operating in the starting state or in the stall state (step Si).

When decision is made in the step S1 that the engine 1 is in the starting state or in the stall state (i.e., when the decision step Si results in the affirmation "Yes"), the current supplied to the solenoids or coils 193 of the oil control valves 19 and 20 is set to a minimum current level or value MIN (step S2), whereupon the procedure exits from the processing routine illustrated in FIG. 2.

The minimum current value MIN may be the nonconducting state current value (i.e., 0 mA). It is however referred to maintain the minimum current value MIN on the order of 100 mA as a stand-by current for the succeeding operation.

On the other hand, when it is decided in the step Si that the engine is neither in the starting state nor in the stall state (i.e., when the decision step Si results in negation "No"), decision is succeedingly made as to whether or not the engine 1 is in the idling state (step S3).

The decision in the step S3 can be made by checking whether the idle switch is on or off or alternatively checking whether the throttle valve is fully closed or not, as is well known in the art.

When the decision step S3 results in that the engine 1 is not in the idling state (i.e., when the step S3 results "No"), the map data position (retarded or advanced position) which conforms with the operating state of the engine 1 is validated (step S4), whereupon the processing routine illustrated in FIG. 2 comes to an end.

In a step S4, the feedback control is carried out so that the desired position stored as map data in a ROM (Read-Only Memory) incorporated in the ECU 21A.

As mentioned previously, the map data are so prepared as to be referenced on the basis of the engine rotation speed (rpm) and the engine load both serving as parameters.

On the other hand, when it is decided in the step S3 that the engine 1 is in the idling state (i.e., when the decision step S3 results in "Yes"), it is then decided whether or not the engine 1 is in the cold state (step S5).

At this juncture, it should be mentioned that the term "cold state" means the state in which the temperature of cooling water of the engine 1 does not exceed 40° C.

When the decision step S5 shows that the engine 1 is not in the cold state (i.e., when the decision step S3 results in "No"), the vanes 152 of the actuators 15 and 16 are so controlled as to be set to the lock-up position (step S6), whereupon the processing routine illustrated in FIG. 2 comes to an end.

In this conjunction, control of the actuators 15 and 16 to the lock-up position is so performed that the cam phase which determines the valve timing is fixedly set to a position suitable not only for the state for and immediately after the engine starting operation described previously but also suitable for ensuring the stability of the idling operation.

By contrast, when decision is made in the step S5 that the engine 1 is in the cold state (i.e., when the decision step S5 results in "Yes"), the valve timing is controlled to advance (step S7), whereupon the control procedure exits the processing routine illustrated in FIG. 2.

When the valve timing is controlled to advance in the step S7, the valve timing may be so controlled as to be set to the most advanced position or alternatively to a given position between the lock-up position and the most advanced position.

The advanced position set in the step S7 should preferably be, for example, such position where the temperature-up effect of the catalyst 12 is significant (e.g. position at which the temperature of the exhaust gas rises at a highest rate) and where the quantity of hydrocarbon (HC) contained in the exhaust gas can be suppressed to a minimum.

As is apparent from the above, when the engine 1 is operating in the cold-state idling mode after the starting operation, the valve timing is so controlled as to advance (step S7). As a result of this, the temperature of the exhaust gas rises up speedily, which is effective for promoting the temperature rise of the catalyst 12.

In particular, by advancing the valve-open start timing of the exhaust valve, the exhaust gas being still undergoing the combustion is discharged to the exhaust pipe 10, which contributes to the temperature rise of the catalyst 12.

Further, when the valve timings of both the intake and exhaust valves are simultaneously controlled so as to advance, the valve overlap period can remain unchanged. Accordingly, stability of the engine operation in the idling mode can be enhanced.

With the locking mechanism incorporated in the actuators 15 and 16, the vanes 152 are latched at the lock-up position suitable for the engine starting operation as well as the immediately succeeding state within the timing change control range (exclusive of the most retarded position and the most advanced position). As a result of this, starting performance of the engine can be improved.

Furthermore, since the locking mechanism is released under the effect of the predetermined hydraulic pressure supplied from the oil pump at least in the cold-state idling operation mode succeeding to the starting operation, the advancing control of the actuators 15 and 16 can be effectuated. Thus, high-temperature exhaust gas is discharged even in the cold-state idling operation mode, whereby activation of the catalyst 12 is promoted, which is effective for reduction of the harmful exhaust gas components.

Moreover, in the warm-up idling operation mode succeeding to the engine starting operation (the state approximating to the engine starting operation state), driving performance can be enhanced by controlling the actuators 15 and 16 to the lock-up position.

Additionally, in the operating state except for the idling state succeeding to the warm-up operation of the engine (e.g. in the ordinary running state at the least), the retarding/advancing control of the valve timings suited for the ordinary running operation can be carried out in dependence on the operating states.

In the valve timing control system according to the instant embodiment of the invention, which is shown in FIG. 1, the actuators 15 and 16 are disposed in association with both the cam shaft 15C for the intake valves and the cam shaft 16C for the exhaust valves, respectively. However, the invention is never restricted to such arrangement. Only one of the actuators 15 and 16 may be disposed in association with one of the cam shafts 15C and 16C.

Furthermore, in the valve timing control system described above, the actuators 15 and 16 are implemented such that the vanes 152 for changing the phase angle are rotationally moved within the respective housings, as described hereinbefore by reference to FIGS. 9 to 11. However, the invention is not restricted to the actuator of such structure. It goes without saying that other types of actuators such as helical type or the like actuator may equally be employed. A second embodiment of the present invention concerns the valve timing control system in which the retarding control of the ignition timing is adopted.

Embodiment 2

In the case of the valve timing control system for the internal combustion engine according to the first embodiment of the invention, the temperature rise of the catalyst 12 and the accelerated purification of the exhaust gas are realized through the valve timing advancing control performed with the aid of the actuators 15 and 16 in the cold-state idling operation mode of the engine 1. It should however be noted that in addition to such valve timing advancing control, the ignition timing of the engine 1 may be so controlled as to be retarded.

In the following, description will be directed to the valve timing control system for the internal combustion engine according to a second embodiment of the present invention, which system is designed to control the ignition timing of the engine 1 so that it is retarded in the idling operation carried out in the engine 1 in the cold state thereof.

Figure 3:
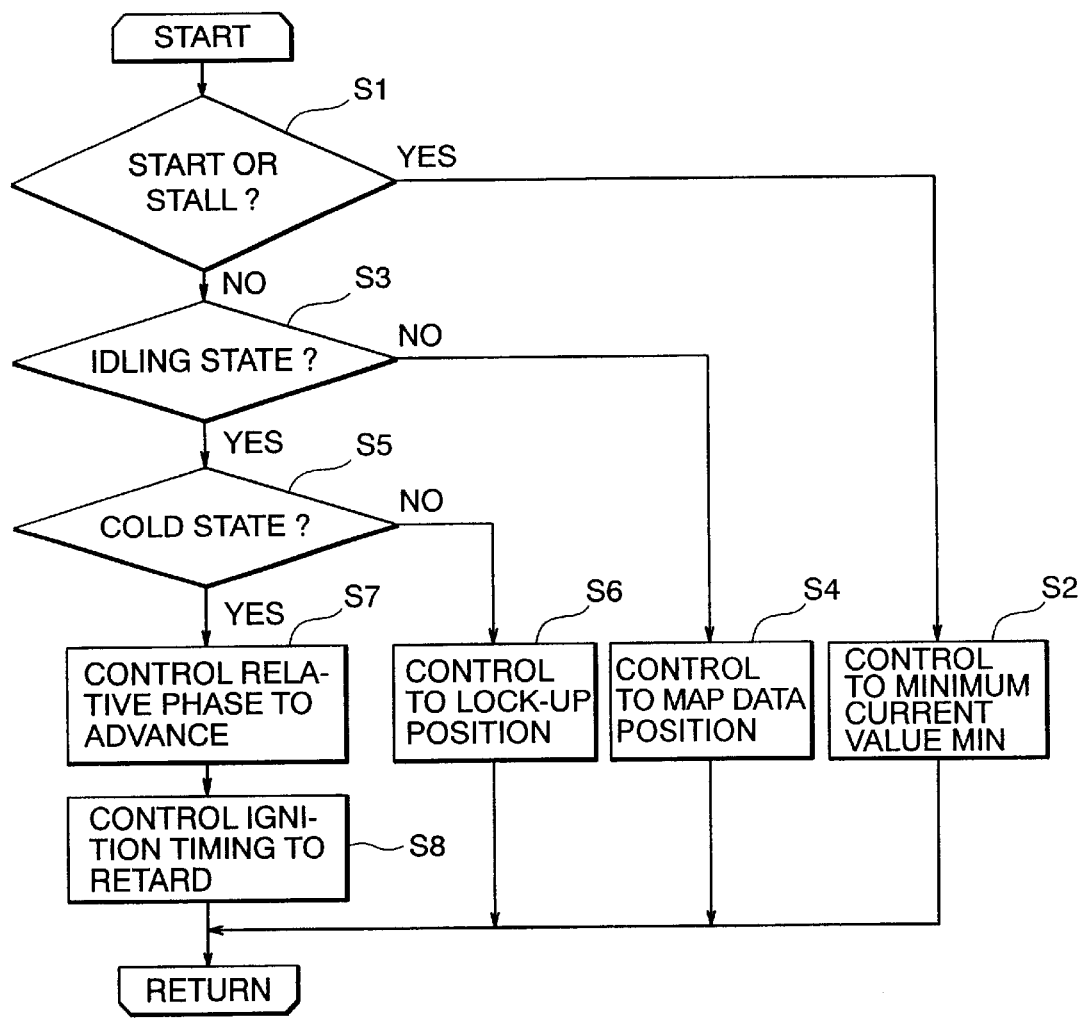
FIG. 3 is a flow chart for illustrating control operation of a valve timing control system according to a second embodiment of the present invention.

FIG. 3 is a flow chart for illustrating control operation of the valve timing control system according to the second embodiment of the invention, wherein the processing steps similar to those described previously by reference to FIG. 2 are affixed with like step identification numbers and repeated description in detail of these steps is omitted.

Now referring to FIG. 3, when it is decided by the ECU 21A (see FIG. 1) in the steps S3 and S5 that the operating state of the engine 1 is in the idling operation mode in the cold state (i.e., when the decision steps S3 and 55 result in affirmation "Yes"), the ECU 21A (see FIG. 1) controls the actuators 15 and 16 so that operation timings thereof are advanced (step S7,) while controlling the ignition timing of the engine 1 so that it is retarded (step S8). Then, the processing routine shown in FIG. 3 comes to an end.

In this manner, by controlling in the step S8 the ignition timing so that it is retarded, speed or rate of the combustion within the combustion chamber of the engine cylinder becomes lowered, the temperature rise of the exhaust gas is promoted.

Thus, the temperature of the catalyst 12 rises up effectively by adopting the ignition timing retarding control in combination with the advancing control of the valve timing described hereinbefore.

It is also noted that by controlling the valve timings of both the intake and exhaust valves to be advanced, the time during which the intake and exhaust valves overlap with each other can remain unchanged, as described previously. Thus, the stability of the idling operation can be enhanced.

As can now be appreciated, by controlling the ignition timing of the engine to be retarded while controlling the valve timing so as to be advanced in the idling operation of the engine 1 in the cold state thereof, the exhaust gas of higher temperature than that described previously can flow into the catalyst 12. As a result of this, the catalyst 12 is heated to high temperature more speedily when compared with the case of the first embodiment to be thereby activated at an earlier time point.

Embodiment 3

In the case of the valve timing control system for the internal combustion engine according to the second embodiment of the invention, the ignition timing of the engine is so controlled as to be retarded in addition to the advancing control of the actuators 15 and 16 in the idling operation of the engine 1 in the cold state thereof. It is however to be noted that the quantity of fuel supplied to the cylinders of the engine 1 may also be so controlled as to be decreased substantially to the similar effect. A third embodiment of the present invention concerns the valve timing control system in which the injection fuel quantity decreasing control is adopted.

In the following, description will be directed to the valve timing control system for the internal combustion engine according to a third embodiment of the present invention, which system is designed to perform the fuel injection quantity decreasing perform in the cold-state idling operation mode of the engine 1.

Figure 4:
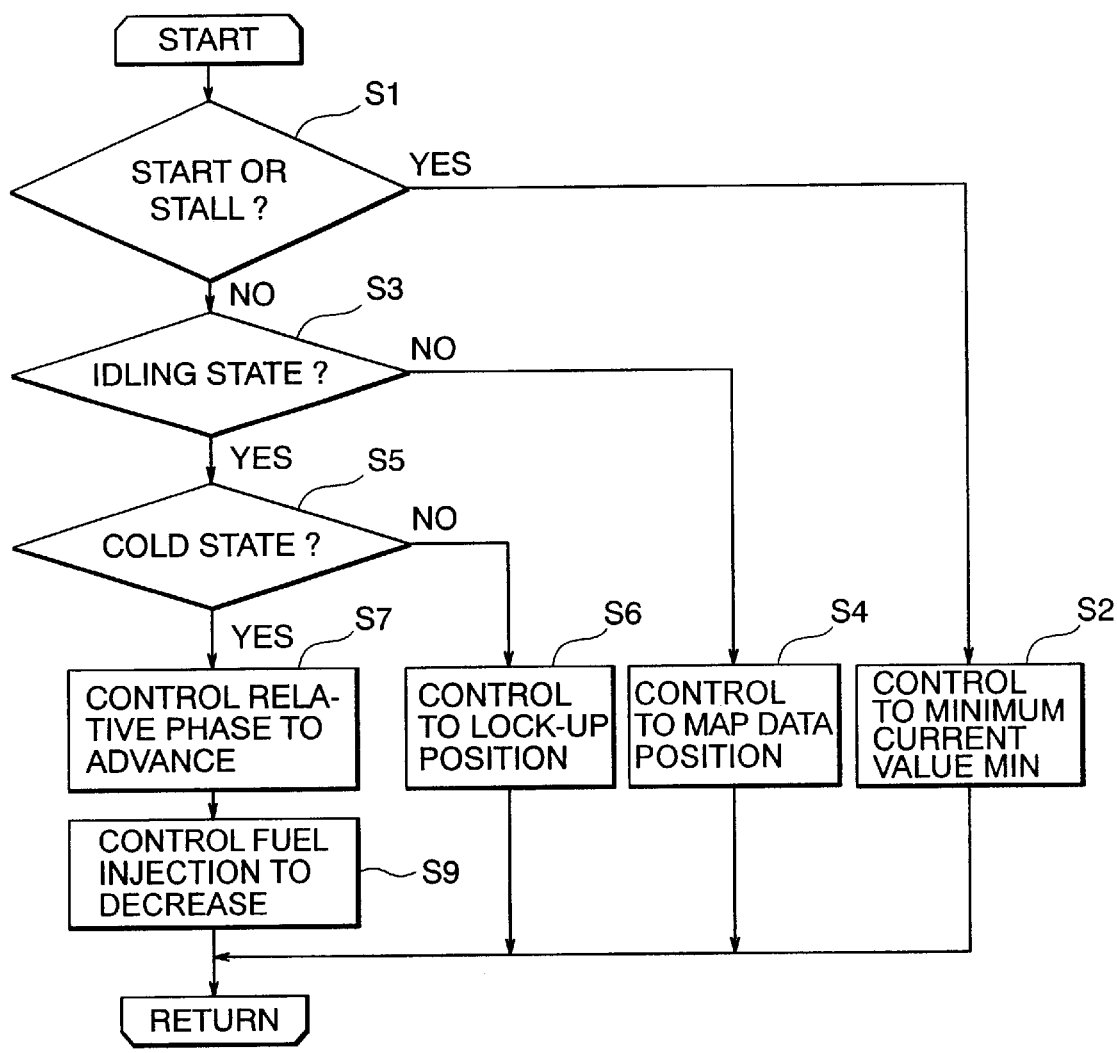
FIG. 4 is a flow chart for illustrating control operation of the valve timing control system according to a third embodiment of the present invention.

FIG. 4 is a flow chart for illustrating the control operation of the valve timing control system according to the third embodiment of the invention, wherein the processing steps similar to those described previously by reference to FIGS. 2 and 3 are affixed with like step numbers and repeated description in detail of these steps is omitted.

Now referring to FIG. 4, when it is decided by the ECU 21A (see FIG. 1) in the steps S3 and S5 that the operating state of the engine 1 is in the idling operation mode in the cold state (i.e., when the decision steps S3 and S5 result in affirmation "Yes"), the ECU 21A controls the actuators 15 and 16 so that the valve actuation timings are advanced (step S7) while controlling the fuel quantity supplied or injected into the cylinders of the engine 1 to be decreased with the air-fuel ratio A/F assuming a lean value (step S9). Then, the processing routine illustrated in FIG. 4 comes to an end.

In this way, when decision is made that the engine 1 is in the idling operation mode in the cold state (i.e., cold-state idling operation mode), the valve timings are so controlled as to be advanced (step S7) while the air-fuel ratio A/F is so controlled as to become lean through the fuel injection decreasing control (step S9). Then, the amount of the harmful components such as hydrocarbon (HC) and others contained in the exhaust gas is further reduced when compared with the reduction solely under the effect of the temperature rise of the catalyst 12 mentioned above, whereby purification of the exhaust gas can be much promoted.

As is apparent from the foregoing, in the colds-tate idling operation mode of the engine, the temperature rise of the catalyst 12 is promoted to be activated at an earlier time point and thus hydrocarbon (HC) and others carried by the exhaust gas can further be decreased.

Embodiment 4

In the case of the valve timing control system for the internal combustion engine according to the second embodiment of the invention, the ignition timing of the engine is controlled to be retarded while in the system according to the fourth embodiment, the fuel injection quantity is controlled to be decreased in addition to the valve timing advancing control performed by the actuators 15 and 16 in the cold-state idling operation mode of the engine 1. In this conjunction, it is to be noted that both the ignition timing retarding control and the fuel injection quantity decreasing control may be carried out simultaneously. A fourth embodiment of the present invention concerns the valve timing control system in which simultaneous control of the ignition timing and the fuel injection quantity is adopted.

In the following, description will be directed to the valve timing control system for the internal combustion engine according to the fourth embodiment of the present invention, in which both the ignition timing retarding control and the fuel injection quantity decreasing control are carried out simultaneously or concurrently in the cold-state idling operation mode of the engine 1.

Figure 5:
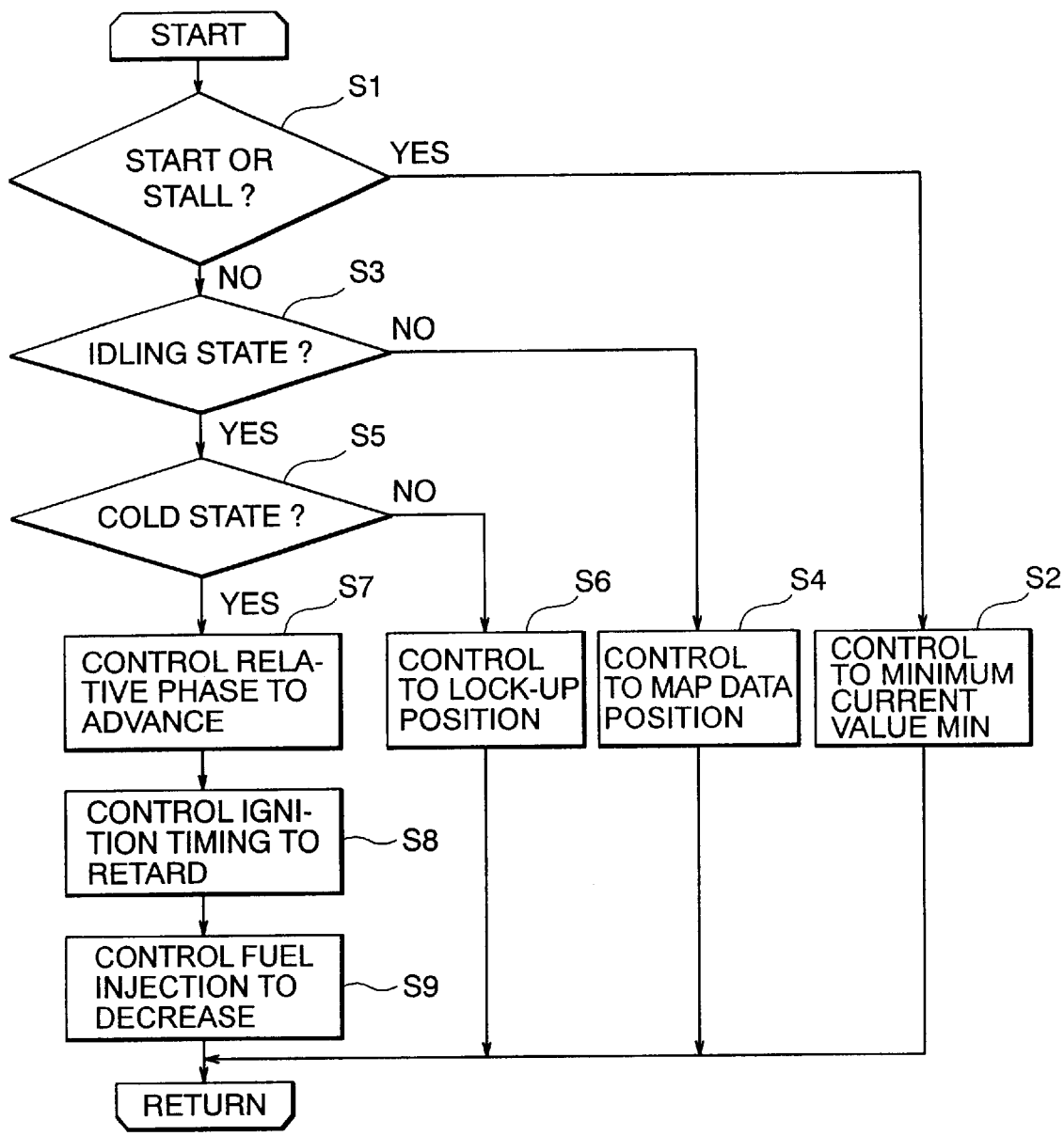
FIG. 5 is a flow chart for illustrating control operation of the valve timing control system for the internal combustion engine according to a fourth embodiment of the present invention.

FIG. 5 is a flow chart for illustrating control operation of the valve timing control system according to the fourth embodiment of the invention, wherein the processing steps similar to those described previously by reference to FIGS. 2, 3 and 4 are affixed with like step numbers and repeated description in detail of these steps is omitted.

Referring to FIG. 5, when it is decided by the ECU 21A (see FIG. 1) in the steps S3 and S5 that the operating state of the engine 1 is in the cold-state idling operation mode (i.e., when the decision steps S3 and S5 result in "Yes"), the ECU 21A controls the actuators 15 and 16 so that valve timings are thereby advanced (step S7) while controlling the ignition timing to be retarded with the air-fuel ratio A/F being controlled to assume a lean level (step S9), whereupon the processing routine shown in FIG. 5 comes to an end.

In this way, by carrying out concurrently the ignition timing retarding control and the fuel injection decreasing control simultaneously with the valve timing advancing control of the actuators 15 and 16 in the cold-state idling operation mode of the engine 1, the temperature rise of the catalyst 12 can be accelerated much more, whereby hydrocarbon (HC) and others contained in the exhaust gas can be reduced more efficiently.

Many features and advantages of the present invention are apparent from the detailed description and thus it is intended by the appended claims to cover all such features and advantages of the system which fall within the true spirit and scope of the invention. Further, since numerous modifications and combinations will readily occur to those skilled in the art, it is not intended to limit the invention to the exact construction and operation illustrated and described. Accordingly, all suitable modifications and equivalents may be resorted to, falling within the spirit and scope of the invention.

What is claimed is:

1. A valve timing control system for an internal combustion engine, comprising:

sensor means for detecting operating states of an internal combustion engine;

intake and exhaust cam shafts for driving intake and exhaust valves, respectively, of said internal combustion engine in synchronism with a rotation of a crank shaft of said internal combustion engine;

at least one actuator operatively connected to at least one of said cam shafts for driving said intake and exhaust valves, respectively;

a hydraulic pressure supply unit for feeding a hydraulic pressure to drive said actuator; and control means for controlling the hydraulic pressure fed from said hydraulic pressure supply unit to said actuator in dependence on said operating states of said internal combustion engine while changing relative phase of said cam shaft relative to said crank shaft, wherein said actuator includes a retarding hydraulic chamber and an advancing hydraulic chamber for setting an adjustable range of said relative phase;

a locking mechanism for setting said relative phase to a lock-up position within said adjustable range; and an unlocking mechanism for releasing said locking mechanism in response to a predetermined level of hydraulic pressure fed from said hydraulic pressure supply unit, and wherein said control means is designed for driving said locking mechanism for thereby controlling said relative phase to be set to said lock-up position when said internal combustion engine is detected as being in a starting operation state, while when said internal combustion engine is in a state which succeeds to said starting operation state, said locking mechanism is released by means of said unlocking mechanism with the hydraulic pressure fed from said hydraulic pressure supply unit to said retarding hydraulic chamber and said advancing hydraulic chamber being controlled for thereby executing a retarding control and an advancing control, respectively, for said relative phase, whereby said relative phase is so controlled as to be advanced when said engine is operating in a cold-state idling operation mode.

2. A valve timing control system for an internal combustion engine according to claim 1, wherein said lock-up position is established as a phase position suited for said control performed in the starting operation mode of said internal combustion engine and in an operation state which immediately succeeds to said starting operation mode.

3. A valve timing control system for an internal combustion engine according to claim 1, wherein said hydraulic pressure supply unit is so designed as to validate said predetermined hydraulic pressure at least when it is detected that said internal combustion engine is operating in said cold-state idling operation mode.

4. A valve timing control system for an internal combustion engine according to claim 1, wherein said control means is so designed as to control said relative phase to be set to said lock-up position when it is detected that said internal combustion engine is operating in an warm-up idling operation mode.

5. A valve timing control system for an internal combustion engine according to claim 1, wherein said control means is so designed as to control an ignition timing of said internal combustion engine to be retarded when it is detected that said internal combustion engine is operating in said cold-state idling operation mode.

6. A valve timing control system for an internal combustion engine according to claim 1, wherein said control means is so designed as to control quantity of a fuel supplied to said internal combustion engine to be decreased when it is detected that said internal combustion engine is operating in said cold-state idling operation mode.

7. A valve timing control system for an internal combustion engine according to claim 1, wherein said control means is so designed as to carry out said relative phase retarding or alternatively advancing control in dependence on said engine operating states at least when it is detected that said internal combustion engine is operating in other operation mode(s) than said warm-up idling operation mode after said engine has been warmed.

* * * * *